United States Patent [19]

Futawatari

[11] Patent Number: 5,421,791
[45] Date of Patent: Jun. 6, 1995

[54] SHIFT CONTROL ARRANGEMENT FOR AUTOMATIC TRANSMISSION

[75] Inventor: Toru Futawatari, Fuji, Japan
[73] Assignee: JATCO Corporation, Fuji, Japan
[21] Appl. No.: 81,174
[22] Filed: Jun. 25, 1993
[30] Foreign Application Priority Data Jun. 25, 1992 [JP] Japan .................................. 4-167613

[51] Int. Cl.⁶ ........................ F16H 59/40; F16H 59/42
[52] U.S. Cl. ................................... 475/117; 475/123; 364/424.1
[58] Field of Search ............................. 475/117, 123; 364/424.1

[56] References Cited

U.S. PATENT DOCUMENTS 4,470,916  11/1990  Narita ................................. 364/424.1
5,052,246  10/1991  Yamaguchi ........................ 364/424.1
5,075,858  12/1991  Narita ................................. 364/424.1

Primary Examiner—Edward K. Look
Assistant Examiner—Christopher Verdier
Attorney, Agent, or Firm—Foley & Lardner

[57] ABSTRACT

A shift control arrangement for an automotive automatic transmission includes a control unit active to change the state of a solenoid disposed in a hydraulic circuit of an automatic transmission during shifting so as to appropriately effect engagement and/or release of a frictional element of the automatic transmission. The control unit is further provided with a fluid temperature compensating portion so as to delay or advance a time of actuation of the solenoid, according to a detected gear ratio, to compensate for changes in fluid viscosity due to temperature, such that optimal shift characteristics for the frictional element are always maintained.

7 Claims, 4 Drawing Sheets

SHIFT CONTROL ARRANGEMENT FOR AUTOMATIC TRANSMISSION

BACKGROUND OF THE INVENTION

1. Field of The Invention

The present invention relates generally to a shift timing control arrangement for an automotive automatic transmission. Specifically, the invention relates to a shift timing control arrangement in which oil temperature and viscosity are considered in determining shift timing.

2. Description of The Prior Art

Shift control arrangements for automatic transmissions are well known in which shift timing for establishing a given gear ratio is controlled by driving means for operating solenoids for engaging various frictional elements of the automatic transmission.

One such conventional shift control arrangement is disclosed in Japanese Patent Application First Publication No. 1-188750.

According to the system disclosed in the above-mentioned publication, a rotational speed of an input shaft and a rotational speed of an output shaft of the automatic transmission are detected and compared for determining a gear ratio. A preset ratio for each kind of shift is changed to an actual ratio after shifting by switching means for switching the state ON * OFF state of a solenoid.

According to the above control, shift timing control is carried out based on a present gear ratio, thus an appropriate shift timing can be obtained, even when non-consecutive, or engine braking type shifting is carried out.

However, the above described conventional shift timing control arrangement does not consider a present fluid temperature and viscosity. Since the viscosity of the transmission fluid can change considerably according to temperature, a timing of engagement of frictional elements effected by a hydraulic circuit of the automatic transmission can vary widely, and, since such considerations are not utilized in conventional shift timing control, shift shock, engine overrevving, and a degraded shift smoothness can result.

Thus it has been required to provide a shift control arrangement for an automatic transmission which can assure smooth shift characteristics regardless of a fluid temperature or viscosity.

SUMMARY OF THE INVENTION

It is therefore a principal object of the present invention to overcome the drawbacks of the prior art.

It is a further object of the present invention to provide a shift control arrangement for an automatic transmission which can determine an optimal shift timing according to a running condition, fluid temperature and fluid viscosity of an automotive vehicle.

In order to accomplish the aforementioned and other objects, a shift control arrangement for an automotive automatic transmission is provided, comprising: a frictional element switchable between an engaged state and a disengaged operating state, a fluid circuit having valve means operative such that the fluid circuit is active to selectively change the operating state of the frictional element, driving means for acting on the valve means so as to change the operating state of the frictional element via the fluid circuit, first means for detecting a rotational speed of a shaft input to the automatic transmission and outputting a first signal indicative thereof, second means for detecting a rotational speed of an output shaft of the automatic transmission and outputting a second signal indicative thereof, calculating means receiving the first and second signals and deriving a gear ratio on the basis thereof, detecting means detecting a temperature of fluid in the fluid circuit and outputting a third signal indicative thereof, and shift control means receiving the first second and third signals and active to change a speed range of the automatic transmission in response to a gear ratio derived by the calculating means corresponding to a predetermined gear ratio, the shift control means further including compensating means operative to control a timing of the changing of the operating state of the frictional element of the automatic transmission according to a temperature of the fluid detected by the detecting means by varying a gear ratio at which the change of operating state of the frictional element occurs.

DESCRIPTION OF THE PREFERRED EMBODIMENT

Figure 1:
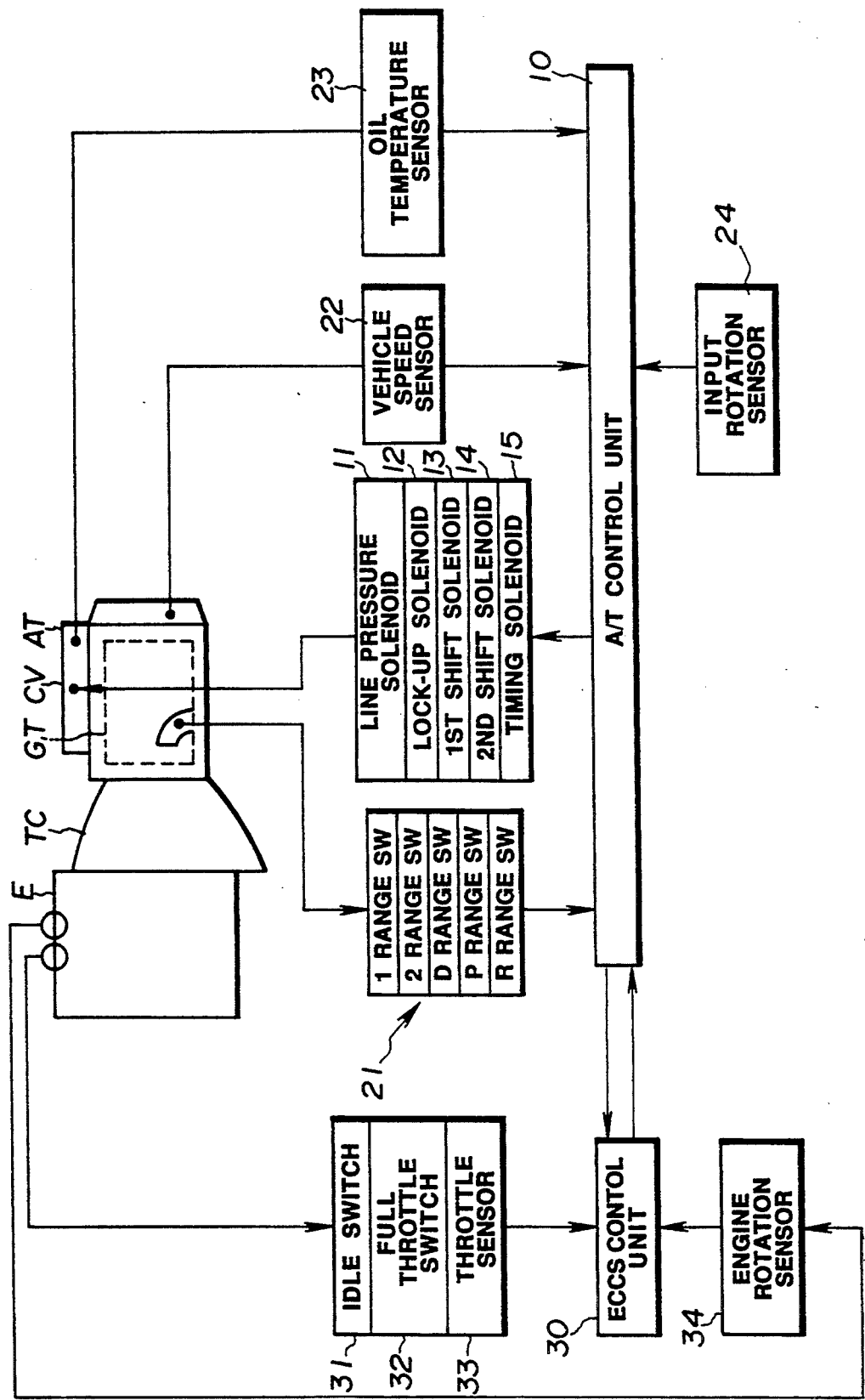
FIG. 1 is a block diagram showing in detail, the components of the arrangement of FIG. 1.

Referring now to the drawings, FIG. 1, shows a block diagram of the components of a shift control arrangement according to the invention. As may be seen in the drawing, an engine E is coupled with an automatic transmission A/T via a torque converter T/C. The output of the torque converter T/C is input to a gear train GT of the automatic transmission A/T.

Figure 2:
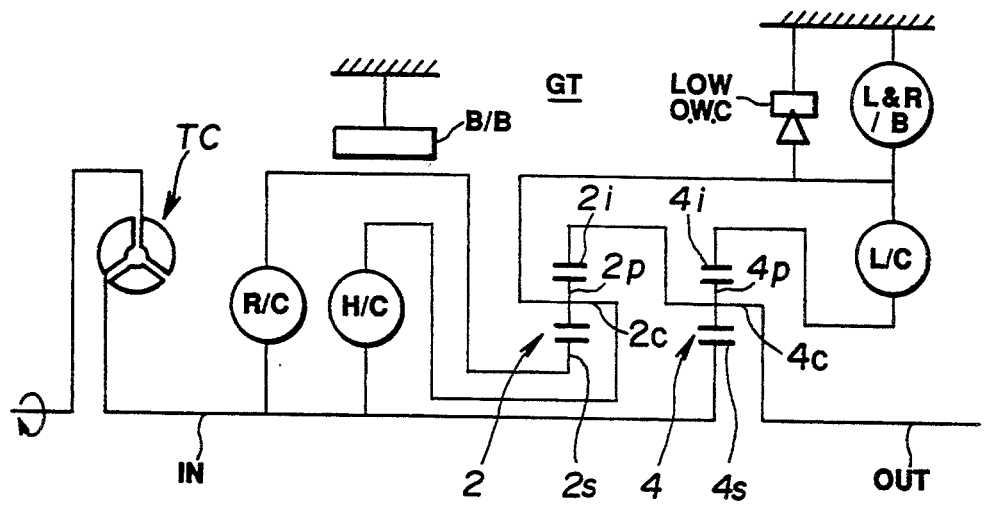
FIG. 2 is a schematic diagram of a gear train of an automatic transmission utilizing the control arrangement according to the invention.

Referring now to FIG. 2, the gear train GT of the automatic transmission A/T comprises a front sun gear 2s, a front pinion gear 2p, a front internal gear 2i, and a front carrier 2c in a front planetary gear assembly 2 and, a rear sun gear 4s, a rear pinion gear 4p, a rear internal gear 4i and a rear carrier 4c in a rear planetary gear assembly 4. The front and rear planetary gear assemblies 2 and 4 are connected in tandem fashion. Also, it will be noted that the rear carrier 4c is engaged with an output shaft OUT of the automatic transmission A/T.

In addition, friction elements of the automatic transmission A/T are arranged such that an input shaft IN of the automatic transmission A/T is engageable with the front sun gear 2s via a reverse clutch R/C, or with the front carrier 2c via a high clutch H/C. The front carrier 2c is engageable with the rear internal gear via a low clutch L/C, and a band brake B/B is disposed on the automatic transmission housing (not shown) side of the the front sun gear 2s. Further, a low and reverse brake L&R/B is disposed on a housing side of the front carrier 2c while a low one-way clutch Low/OWC is disposed between the front carrier 2c and the the housing.

The above described friction elements are engaged according to control of a hydraulic circuit of the automatic transmission A/T by a control valve assembly CV, as seen in FIG. 1. The friction elements are engaged according to a shift state of the automatic transmission A/T as shown in the following table 1.

TABLE 1

| GEAR RANGE | | FRICTION ELEMENT | | | | | |
|---|---|---|---|---|---|---|---|
| | | R/C | H/C | L/C | B/B | L&R/B | Low/OWC |
| | Reverse | o | | | | o | |
| D RANGE | 1st | | | | | | o |
| | 2nd | | | o | o | | |
| | 3rd | o | o | | | | |
| | 4th | o | o | | o | | |
| ENGINE BRAKING | 1st | | | | o | (o) | |
| | 2nd | | | o | o | | |
| | 3rd | o | o | | | | |
| | 4th | o | o | | o | | | o = engaged

It will be noted that when the front carrier 2c rotates in a normal direction the low one-way clutch Low/OWC is disengaged while, when the front carrier 2c rotates opposite to a normal direction thereof, the low one-way clutch Low/OWC is locked.

Engagement/disengagement of each frictional element is controlled via line pressure in the hydraulic circuit of the automatic transmission A/T by the control valve assembly C/V. Valve operation for establishing engagement of frictional elements as shown in table 1 is initiated in response to a selected position of a selector lever (not shown) of the automatic transmission A/T and actuation of solenoids 11–15 to appropriate ON or OFF states. Driving control of the solenoids 11–15 is effected by the A/T control unit 10 (switching means). As seen in FIG. 1, the A/T control unit receives input from an inhibitor switch portion 21 including a 1st gear range switch, a 2nd gear range switch, a D gear range switch, a P gear range switch and an R gear range switch. The A/T control unit 10 also receives input from a vehicle speed sensor 22, a fluid temperature sensor 23, an input rotational speed sensor 24 and from an ECCS control unit 30. The ECCS control unit 30 receives input from an engine rotational speed sensor 34 and from the engine E via an idle switch 31, a full throttle switch 32 and a throttle sensor 33 which are interposed between the ECCS control unit 30 and the engine E. Based on a signal output from the engine rotational speed sensor 34 the line pressure solenoid 11, the lock-up solenoid 12, the 1st shift solenoid 13, the 2nd shift solenoid 14 and the timing solenoid 15 are suitably controlled. Further, it will be noted that the vehicle speed sensor 22 calculates the vehicle speed based on an output rotational speed of the automatic transmission A/T.

The following table 2 shows the ON * OFF status of the 1st and 2nd shift solenoids 13 and 14 according to a selected gear range of the automatic transmission A/T.

TABLE 2

| GEAR POSITION | 1ST SHIFT SOLENOID | | 2ND SHIFT SOLENOID | |
|---|---|---|---|---|
| 1st range | O | N | O | N |
| 2nd range | O | F F | O | N |
| 3rd range | O | F F | O | F F |
| 4th range | O | N | O | F F |

Figure 3:
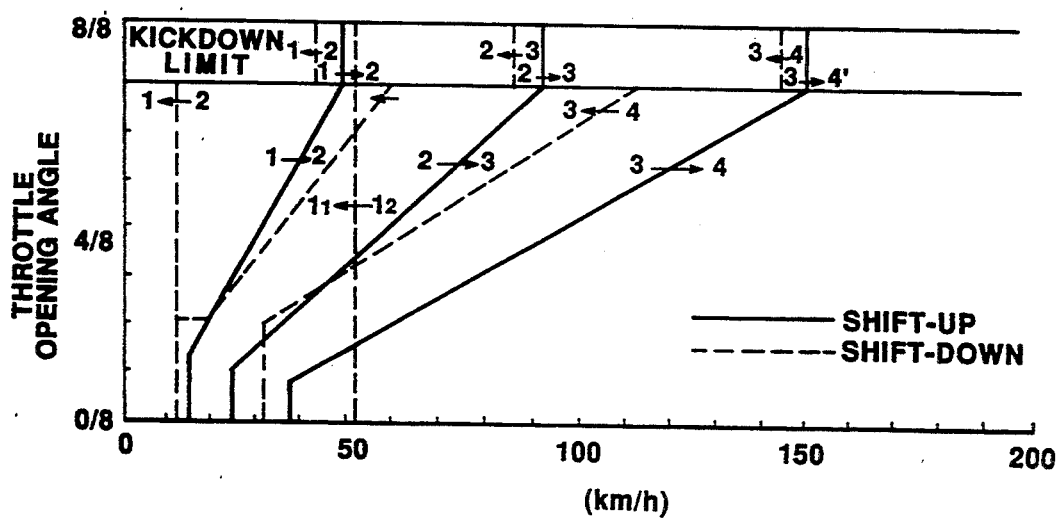
FIG. 3 is a graph showing a shift schedule according to shift control of the invention.

According to this arrangement, the A/T control unit 10 controls the 1st and 2nd shift solenoids 13 and 14 based on a throttle opening angle detected by the throttle sensor 33 and a vehicle speed signal from the vehicle speed sensor 22. For example, FIG. 3 shows a shift schedule determined according to a throttle opening angle and vehicle speed.

Figure 4:
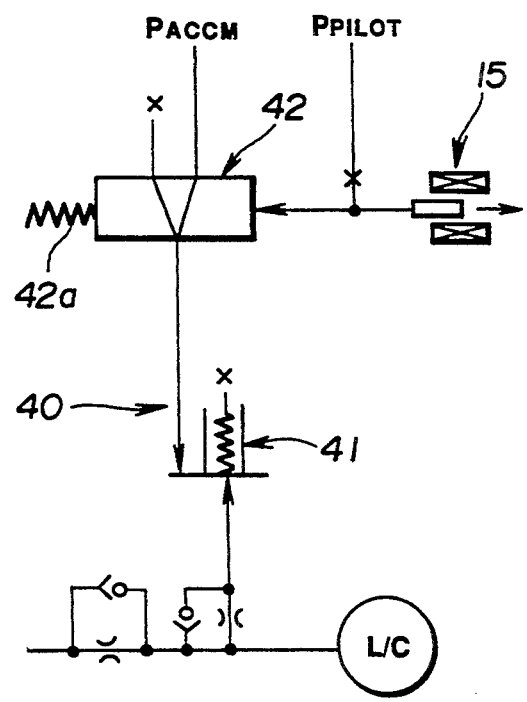
FIG. 4 is an enlarged schematic diagram of a valve arrangement of a hydraulic circuit of the invention.

Next, referring to FIG. 4, a hydraulic connection between the timing solenoid 15 and the low clutch L/C is shown. As seen in the drawing the hydraulic circuit 40 has a low clutch accumulator valve 41 and a low clutch timing valve 42 (circuit switching means) disposed therein. As seen in table 1, the low clutch L/C is engaged in 1–3 gear ranges. Further, at the time of a 4–3 shift down (from the 4th gear range to the 3rd gear range of the automatic transmission A/T) the low clutch timing valve is active to raise the low clutch operating pressure $P_{L/C}$ for effecting timing control. For effecting smooth shifting, the A/T control unit 10 is active for switching the timing solenoid 15. As seen in FIG. 4, when the timing solenoid 15 is switched ON, pilot pressure $P_{PILOT}$ of the hydraulic circuit 40 is active to move the low clutch timing valve 42 to the left in FIG. 4 such that back pressure of the low clutch accumulator valve is drained and a substantially low standby level of the low clutch operating pressure $P_{L/C}$ is established.

From the above described state, when the timing solenoid 15 is switched to an OFF state, the low clutch timing valve 42 is pushed to the right of FIG. 4 by the biasing force of a spring 42a such that back pressure of the low clutch accumulator valve 41 becomes the accumulator pressure $P_{ACCM}$ and the low clutch operating pressure $P_{L/C}$ becomes the same as the accumulator pressure $P_{ACCM}$ and engagement of the low clutch L/C is established.

As mentioned, the timing solenoid 15 is driven by the A/T control unit 10. Next, referring to FIG. 6, a flowchart of a routing for determining appropriate driving control of the timing solenoid 15 will be explained in detail.

Figure 6:
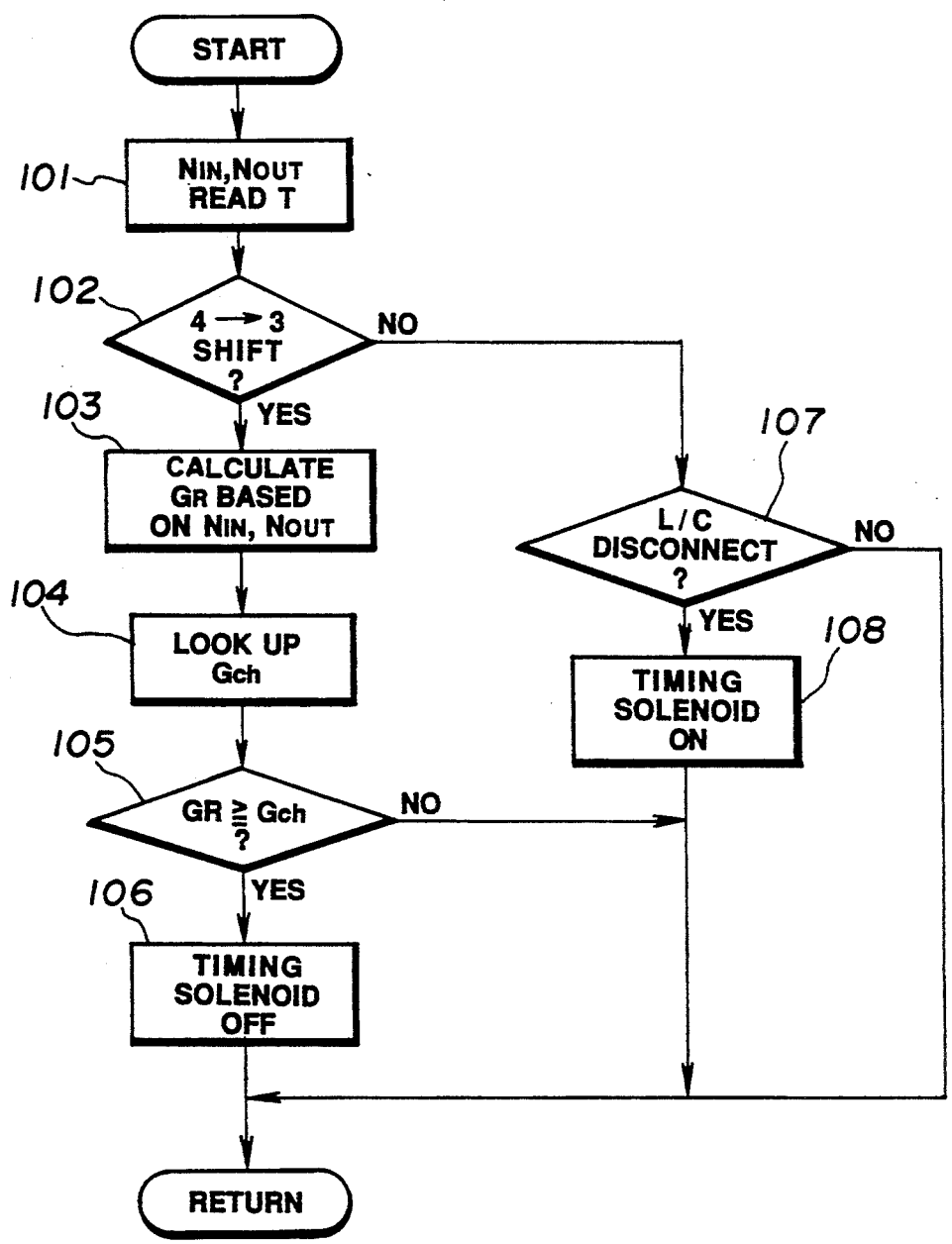
FIG. 6 is a flowchart of a control routine executed in accordance with the control arrangement of the invention.

Referring to FIG. 6, at a step 101 of the routine, an input rotational speed $N_{IN}$ is read from the input rotation sensor 24, an output rotational speed $N_{OUT}$ of the automatic transmission A/T is read as well as a temperature T from the fluid temperature sensor 23.

Next, at a step 102, it is determined whether or not a 4–3 shift has been made. If NO in step 102, the routine proceeds to a step 107. It will be noted that the A/T control unit 10 includes other programs for control of the automatic transmission A/T other than the routine of FIG. 6 for normally controlling the automatic transmission A/T in a condition other than a 4–3 shift as shown by the shift schedule of FIG. 3, for example.

If YES in step 102, the routine proceeds to a step 103 in which a gear ratio GR is calculated based on the values of $N_{IN}$ and $N_{OUT}$ detected in step 101.

Then, in a step 104, a gear change value $G_{ch}$ is read from a map (not shown) held in memory in the A/T control unit 10. The appropriate gear change value $G_{ch}$ is selected based on the gear ratio GR determined in step 103 and the fluid temperature read at step 101. The gear change value $G_{ch}$ represents an optimal gear ratio for effecting actuation of the timing solenoid 15, for example, if the fluid temperature is substantially high, a value G3 representative of the 3rd gear range is selected. Conversely, if the detected fluid temperature T is substantially low, a value G4 representative of the 4th gear range is selected as the gear change value $G_{ch}$. The values stored in the map represent appropriate values based on an optimal gear ratio for executing shifting in consideration of the fluid temperature T as established by experimentation by the inventors. The map may be referred to as a temperature compensating means.

Next, at a step 105, comparison is made to determine if the gear ratio GR is greater than or equal to the gear change value $G_{ch}$.

If the answer is YES at step 105, the routine proceeds to a step 106 and the timing solenoid 15 is turned OFF. If the answer is NO at step 105 the program goes to RETURN to be run in a subsequent cycle.

In step 107, which is entered when no 4–3 shift is detected, a determination is made as to whether the low clutch L/C is engaged or not. If YES in step 107, the routine proceeds to a step 108 at which the timing solenoid 15 is turned ON. If NO in step 107, the routine goes to RETURN.

Hereinbelow an operation of the arrangement according to the preferred embodiment will be described in detail with reference to the timing chart of FIG. 5.

Normally, the A/T-control unit 10 controls gear shifting, including engagement and/or release of frictional elements, of the automatic transmission A/T according to a throttle opening angle detected by the throttle sensor 33 and a vehicle speed detected by the vehicle speed sensor 22.

Particularly, when a 4–3 shiftdown is made, in the 4th gear range the high clutch H/C and the band brake B/B are engaged and, when shifting down, the band brake B/B is released and the low clutch L/C is engaged.

Figure 5:
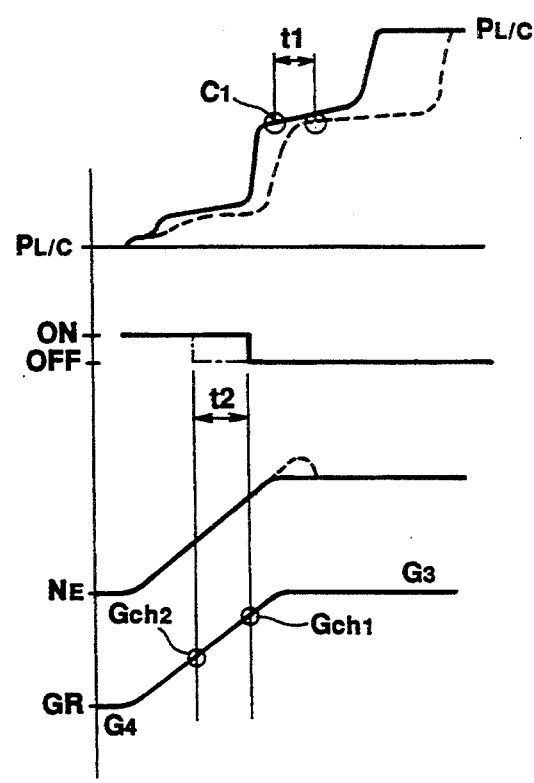
FIG. 5 is a timing chart illustrating automatic transmission control according to the invention.

Referring to FIG. 5, at the time of release of the band brake B/B, the gear ratio GR at a time before the 4–3 shift (4th gear range) corresponds to the gear ratio G4 and after the 4–3 shift (3rd gear range) is changed to the gear ratio G3. During the shift a gear change value $G_{ch1}$ is determined and the timing solenoid 15 is turned OFF (flowchart steps 102-103-104-105-106). At this, back pressure is created at the low clutch operating pressure $P_{L/C}$ causing the low clutch L/C to become engaged at a point C1.

Since the viscosity of fluid in the automatic transmission A/T is varied according to the temperature thereof, at low temperatures the low clutch operating pressure $P_{L/C}$ is caused to rise undesirably. During normal operation, the low clutch operating pressure $P_{L/C}$ is caused to vary as shown by the solid line in FIG. 5. When the fluid temperature is low, according to the state of the timing solenoid 15, the low clutch operating pressure $P_{L/C}$ is caused to vary as shown by the dotted line of FIG. 5. Thus, as seen in FIG. 5, pressure rising characteristics of the low clutch operating pressure $P_{L/C}$ are delayed by an interval t1.

Thus, according to the present embodiment, at step 104 of the flowchart of FIG. 6, a gear change value $G_{ch}$ for operation of the timing solenoid 15 at the time of a 4–3 shift is determined responsive to fluid temperature. As seen in the drawing, at low temperature a gear change value $G_{ch2}$ close to the 4th gear range gear ratio G4 is determined and the state of the timing solenoid 15 is made faster, by an interval t2, than under normal (high temperature) operation. According to this, the delay in pressure rising characteristics of the low clutch operating pressure $P_{L/C}$ is offset and appropriate engagement timing is established and smoother shift characteristics are obtained. Overrevving and/or interlock, shown by a dotted portion of a line NE of FIG. 5 representing an engine rotational speed, is prevented and better shift characteristics for the vehicle are reliably assured.

It will be noted that the present invention is not limited to the above-described embodiment. That is, although the embodiment described above relates to control of an engagement timing of a low clutch L/C according to actuation of a timing solenoid 15, the arrangement of the present invention may also be preferably utilized for control timing of any other type of valve, or the like. Further, the arrangement may be adapted for upshift operation of an automatic transmission A/T in addition to downshift operations.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A control arrangement for an automatic transmission comprising:
    a frictional element has an operating state switchable between an engaged and a disengaged state;
    a fluid circuit having valve means operative such that said fluid circuit is active to selectively change said operating state of said frictional element;
    driving means for acting on said valve means so as to change said operating state of said frictional element via said fluid circuit;
    first means for detecting a rotational speed of a shaft input to said automatic transmission and outputting a first signal indicative thereof;
    second means for detecting a rotational speed of an output shaft of said automatic transmission and outputting a second signal indicative thereof;
    calculating means receiving said first and second signals for calculating a gear ratio on a basis of said first and second signals;
    third means for detecting a temperature of fluid in said fluid circuit and outputting a third signal indicative thereof; and
    control means responsive to the calculated gear ratio for changing the operating state of the frictional element to change a speed range of said automatic transmission when the calculated gear ratio corresponds to a gear ratio change value, and for controlling a timing of said changing of said operating state of said frictional element of said automatic transmission according to the temperature of said fluid detected by said third means by varying the gear ratio change value at which said change of operating state of said frictional element occurs.

2. A shift control arrangement as set forth in claim 1, wherein said control means is operative to vary the gear ratio change value only during a downshifting operation of said automatic transmission.

3. A shift control arrangement as set forth in claim 1, wherein at high fluid temperatures said gear ratio change value at which said change of operating state of said frictional element occurs is closer to a gear ratio established after said speed range of said automatic transmission is changed.

4. A method for controlling a shift operation in an automatic transmission including a fluid circuit for changing an operating state of a frictional element between an engaged and disengaged state, the method comprising the steps of:
   detecting a first rotational speed of an input shaft of the automatic transmission;
   detecting a second rotational speed of an output shaft of the automatic transmission;
   calculating a gear ratio on a basis of the first and second rotational speeds;
   detecting a fluid temperature of fluid in the fluid circuit;
   selecting a gear ratio change value on a basis of the calculated gear ratio and the detected fluid temperature; and
   changing the operating state of the frictional element when the calculated gear ratio equals the selected gear ratio change value.

5. A method as recited in claim 4, wherein the automatic transmission shifts from a first gear ratio to a second gear ratio as a result of the shift operation.

6. A method as recited in claim 5, wherein the selecting step further comprises the steps of:
   selecting a first gear ratio change value when the detected fluid temperature is at a relatively high temperature; and
   selecting a second gear ratio change value when the detected fluid temperature is at a relatively low temperature, the first gear ratio change value being closer to the second gear ratio and the second gear ration change value being closer to the first gear ratio.

7. A method as recited in claim 5, wherein the selecting step only uses the detected temperature to select the gear ratio change value when the shift operation is a downshift.

* * * * *